Figure 1:
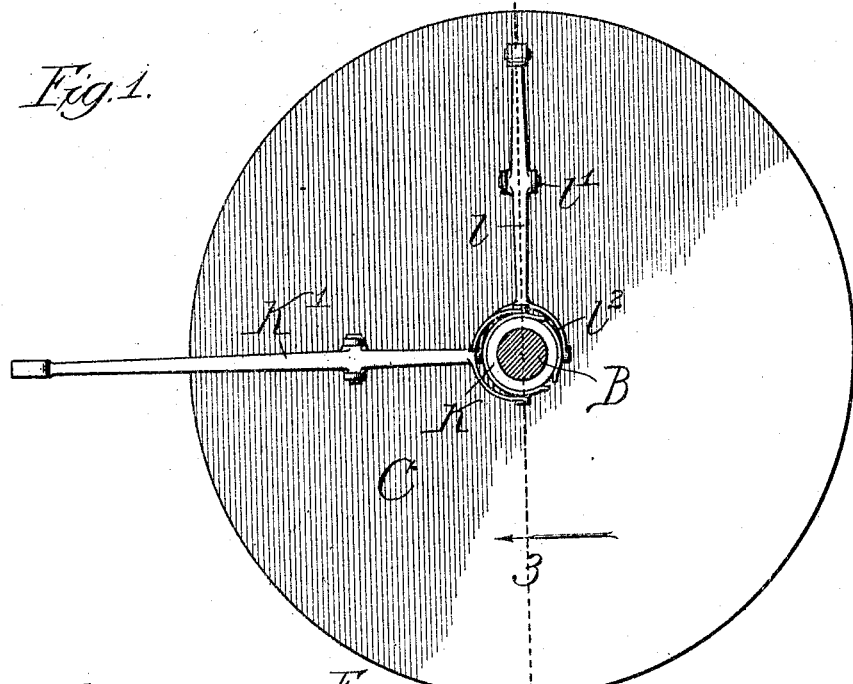

No. 812,483. PATENTED FEB. 13, 1906.
F. DE COLIGNY.
POWER TRANSMISSION DEVICE.
APPLICATION FILED AUG. 7, 1905.

3 SHEETS—SHEET 1.

Witnesses:
John Enders
Chas. H. Buell

Inventor:
Frank de Coligny,
By Dyrenforth, Dyrenforth & Lee,
Attys.

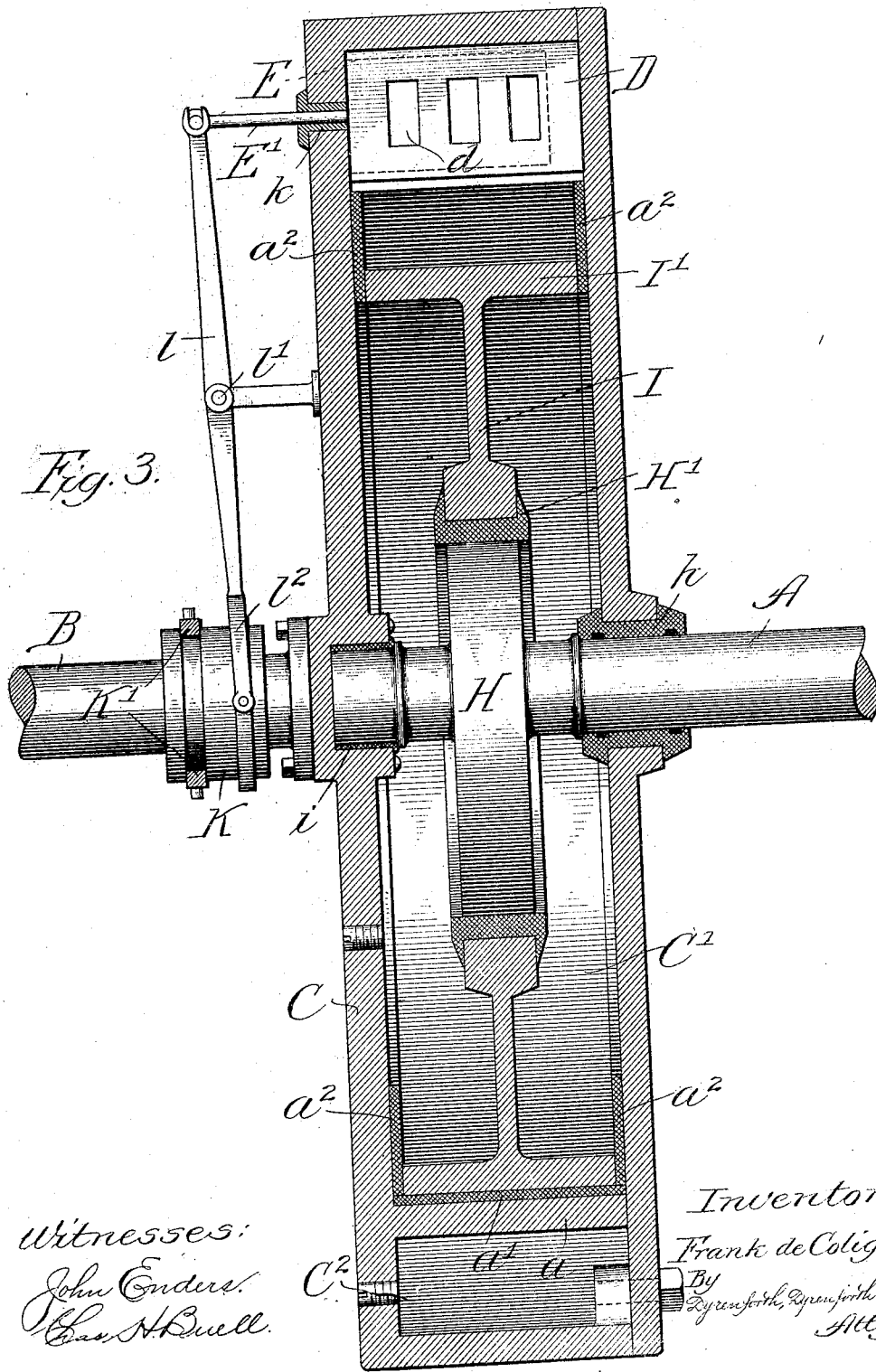

UNITED STATES PATENT OFFICE.

FRANK DE COLIGNY, OF CHICAGO, ILLINOIS.

POWER-TRANSMISSION DEVICE.

No. 812,483.

Specification of Letters Patent.

Patented Feb. 13, 1906.

Application filed August 7, 1905. Serial No. 273,047.

*To all whom it may concern:*

Be it known that I, FRANK DE COLIGNY, a citizen of the United States, residing at Chicago, in the county of Cook and State of Illinois, have invented a new and useful Power-Transmission Device, of which the following is a specification.

My invention relates to improvements in the construction of apparatus which is interposed between driving and driven shafts or the like to vary the imparted power and speed by controlling the circulation or degree of slip of a confined body of practically incompressible fluid through which the driving force is transmitted.

My object is to provide a power and speed transmitting device of the above class of simple, compact, and generally-improved construction, adapting it more especially for use upon automobiles.

In the drawings I show a simple embodiment of my invention as I prefer in a general way to construct it for use in automobiles to vary the speed and power transmitted from a power-shaft running at regular speed to a propeller-shaft.

Figure 2:
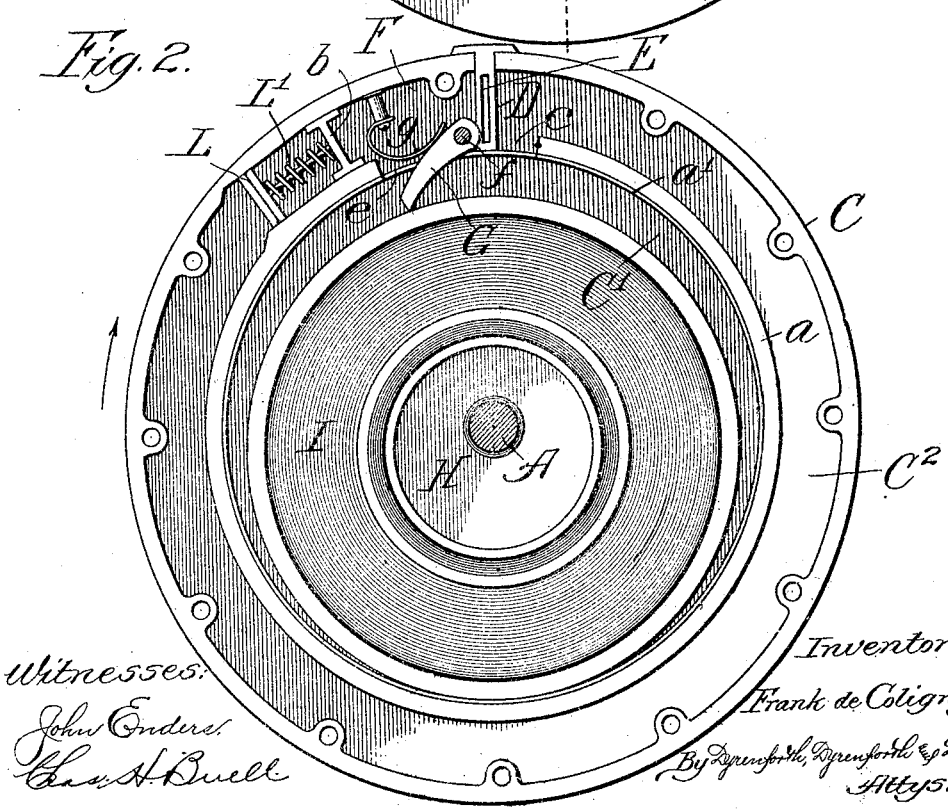

Referring to the drawings, Figure 1 is a sectional side elevation of the device; Fig. 2, a section through the device in a plan parallel with Fig. 1, and Fig. 3 an enlarged cross-section taken on line 3 in Fig. 1.

A is the power or driving shaft, and B the propeller or driven shaft. The latter carries at its end a cylinder C, having an inner chamber C', nearly surrounded by a wall $a$. Extending around the wall $a$ is an outer chamber $C^2$, which has a wall $b$ at one end and opens at its opposite end through port $c$ into the chamber C'. Extending across the chamber $C^2$ in the position shown is a hollow wall or abutment D, having ports $d$ through it and forming the casing of a slide-valve E, provided with ports adapted in the sliding of the valve to open and close the ports $d$. Between the walls $b$ D is a chamber F, opening through a port $e$ into the chamber C'. Hinged at $f$ is a swinging deflector or abutment G of the exact width of the chamber C' and pressed, as shown, by a spring $g$.

The driving-shaft A is in line with the shaft B, passing through a stuffing-box $h$ in one wall of the casing C and journaled at its end in a bearing-socket $i$ in the opposite wall of the same. Midway between the walls of the chamber C' is a wheel H, eccentrically fixed upon the shaft A. The rim of the wheel H is formed with an annular bearing-recess H', in which fits the inner periphery of a rotary ring or wheel I, having a flanged rim portion I'. The nearly annular and circumferential wall $a$ is provided with a lining $a'$, of leather or the like, terminating or cut away at the openings $c$ $e$. The side walls near the circumference of the chamber C' are also lined with annular strips of leather or the like $a^2$. The opposite edges of the rim I' slide in contact with the linings $a^2$, and the face of the rim is maintained by the eccentric in rolling contact with the lining $a'$ and yielding deflector G.

The valve E has a stem E' passing through a stuffing-box $k$ in the wall of the casing, and connected with the said stem is a lever $l$, fulcrumed at $l'$ and having a bifurcated end $l^2$ loosely embracing a sliding collar K on the shaft B.

K' is a lever mounted in a suitable support and having a bifurcated end also loosely embracing the collar K, as indicated.

The chamber $C^2$ is filled with oil or other suitable incompressible fluid and forms, in effect, an oil-storage chamber, the oil also filling the space in the chamber C' between the rim I' and lining $a'$, as well as the chamber F. Owing to the difficulty that there may be of maintaining an oil-tight joint between the rim I' and linings $a^2$, the chamber C' within the rim I' may also be filled with oil, which is prevented from escaping by the stuffing-box $h$. In the end of the chamber $C^2$, near the wall $b$, I provide a plunger-piston L, backed by a spring L'. In filling the device with oil pressure may be employed to move the piston L against the resistance of the springs L', whereby in the event of more or less slight leakage of oil the piston will advance to compensate therefor and operate to keep the oil in the chambers at all times under slight pressure.

In the rotation of the prime mover or drive-shaft A the eccentric is rotated, thereby causing the wheel I to rotate thereon and roll upon the inner periphery or lining $a'$ of the chamber C'. The direction of the angular movement of the wheel I is indicated by the arrow in Fig. 2. The ports $d$ in the abutment D afford when open free communication between the chambers F C². Therefore when the valve E is opened the wheel I as it rolls around forces the oil entering at c out through the opening e to the chamber F and thence back to the chamber C². The chamber F, ports d, and chamber C² form a circulating-conduit for the oil between the ports e c. During this free circulation of the oil practically no working pressure is exerted by it against the abutment D, and the casing C and propeller-shaft will not be rotated. The yielding deflector G being in constant contact with the rim I' deflects all the oil forced by the wheel into the chamber F. Gradual closure of the valve E reduces the slip of the oil through the ports of the abutment D and causes gradually-increasing pressure to be exerted against the casing at the abutment D to rotate it and the propeller-shaft. Complete closing of the valve E, which shuts off circulation of the oil, causes that portion of the oil between the line of contact of the rim I' with the wall a', on the one hand, and the yielding abutment G and fixed abutment D, on the other hand, to form an unyielding filler, whereby the propeller-shaft will be rotated at the same speed as the power-shaft. Thus under a given resistance the comparative velocity of the propeller-shaft will depend upon the adjustment of the valve E, effected through the lever l and collar K by adjustment of the lever K'. The wheel I is, in effect, a pump and works without material frictional resistance in rolling upon the surface a', and as all the parts are in an oil-bath frictional resistance between moving surfaces is reduced to a minimum.

Naturally my improved power-transmission device would operate were the shaft B the power-shaft and A the propeller-shaft. The cylindrical casing C would be made in sections and suitable means provided for fastening the sections securely together, with oil-tight joints between them. The valve which governs the slip of oil and its operating means should be so constructed as to be under perfect control of the attendant, whereby the changes in relative speed transmitted to the propeller-shaft may be quickly and accurately accomplished.

What I claim as new, and desire to secure by Letters Patent, is—

1. In a power-transmission device, the combination with the driving and driven parts, of a cylinder on one of said parts having an inner bearing-surface surrounding an oil-chamber provided with inlet and outlet ports, and an oil-circulating conduit communicating with the ports, a wheel eccentrically mounted on the other of said parts to have independent rotation thereon in rolling contact with the said surface in the said chamber, a resilient deflector in said chamber between the said ports and bearing against the said wheel, a valve in said conduit, and operating means for the valve.

2. In a power-transmission device, the combination with the driving and driven parts, of a cylinder on one of said parts having an inner bearing-surface surrounding an oil-chamber provided with inlet and outlet ports, and an oil-circulating conduit communicating with the ports, an inner wheel eccentrically fastened to the other of said parts, an outer wheel rotating on the said inner wheel in said chamber in rolling contact with the said bearing-surface, a resilient deflector in said chamber between the said ports and bearing against the said outer wheel, a valve in said conduit, and operating means for the valve.

3. In a power-transmission device, the combination with the driving and driven parts, of a cylinder on one of said parts containing an oil-chamber provided with circumferential and side bearing-walls and provided in its circumference with inlet and outlet ports, and an oil-circulating conduit communicating with the ports, an inner wheel eccentrically fastened to the other of said parts, an outer wheel rotating on the said inner wheel in said chamber in rolling contact with the circumferential wall and in sliding contact with the said side walls, a resilient deflector in said chamber between the said ports and bearing against the said outer wheel, a valve in said conduit, and operating means for the valve.

4. In a power-transmission device, the combination with the driving and driven parts, of a cylinder on one of said parts having an outer oil-storage chamber and an inner oil-chamber provided with circumferential and side bearing-walls and provided at its circumference with inlet and outlet ports, an oil-circulating conduit extending from said outlet-port to the said outer chamber, the inlet-port being an opening between the chambers, an inner wheel eccentrically fastened to the other of said parts, an outer wheel rotating on the said inner wheel in said inner chamber in rolling contact with the circumferential wall and in sliding contact with the said side walls, a resilient deflector in said inner chamber between the said ports and bearing against the said outer wheel, a valve in said conduit, and operating means for the said valve.

5. In a power-transmission device, the combination with alined driving and driven shafts, of a cylinder on one of said shafts having an inner bearing-surface surrounding an oil-chamber provided with inlet and outlet ports, and an oil-circulating conduit communicating with the ports, the other shaft extending through a stuffing-box in one side of said chamber and into a bearing in the other side thereof and carrying an inner eccentric wheel in said chamber, an outer wheel rotating on the said inner wheel in rolling contact with said bearing-surface, and in sliding contact with the side walls of said chamber, a resilient deflector in said chamber between the said ports and bearing against said outer wheel, a valve in said conduit, and operating means for the valve.

FRANK DE COLIGNY.

In presence of—
J. H. LANDES,
A. U. THORIEN.